F. W. PUTNAM.
SAFETY APPLIANCE FOR AUTOMOBILES.
APPLICATION FILED JUNE 30, 1911.

1,098,355.

Patented May 26, 1914.

Witnesses

Inventor
Franklin W. Putnam,
By
C. L. Parker.
Attorney

UNITED STATES PATENT OFFICE.

FRANKLIN W. PUTNAM, OF BINGHAMTON, NEW YORK.

SAFETY APPLIANCE FOR AUTOMOBILES.

1,098,355.  Specification of Letters Patent.  Patented May 26, 1914.

Application filed June 30, 1911. Serial No. 636,262.

*To all whom it may concern:*

Be it known that I, FRANKLIN W. PUTNAM, a citizen of the United States, residing at Binghamton, in the county of Broome and State of New York, have invented certain new and useful Improvements in Safety Appliances for Automobiles, of which the following is a specification.

This invention relates to a device for use in connection with an automobile to prevent the engine being cranked when the transmission gear is in a condition to transmit power from the engine to the wheels of the automobile.

An important object of this invention is to provide means for holding the crank against movement by the operator when the clutch is in operative position or adjustment for transmitting power from the engine to the wheels.

A further object of this invention is to provide means of the above mentioned character, which may be applied to different types of automobiles, which is inexpensive to manufacture, simple and durable in construction, convenient and reliable in operation.

Other objects and advantages of this invention will be apparent in the following specification.

Figure 1:
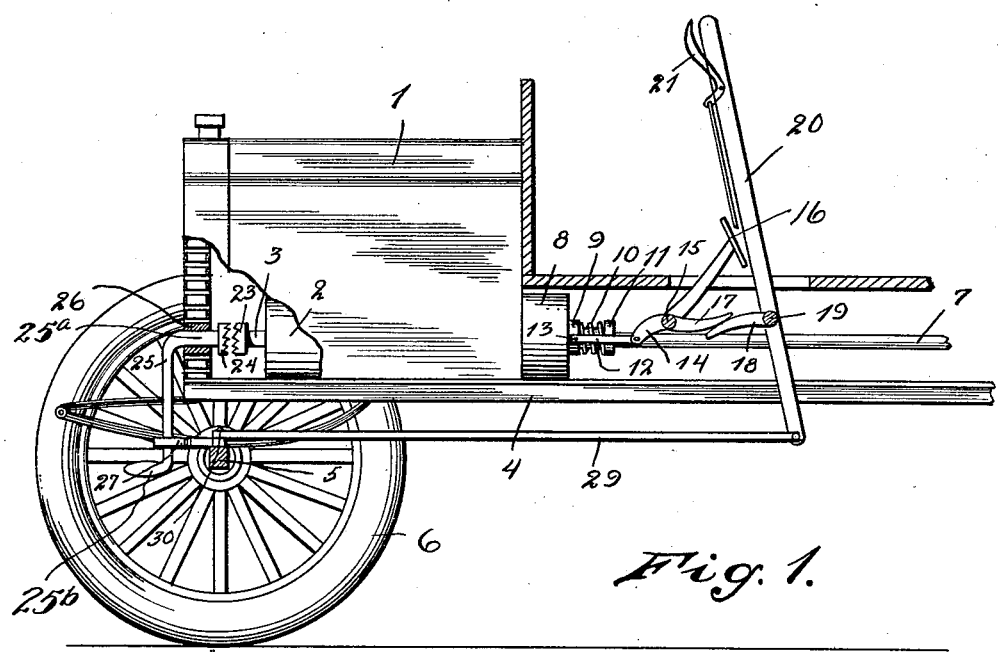
Figure 2:
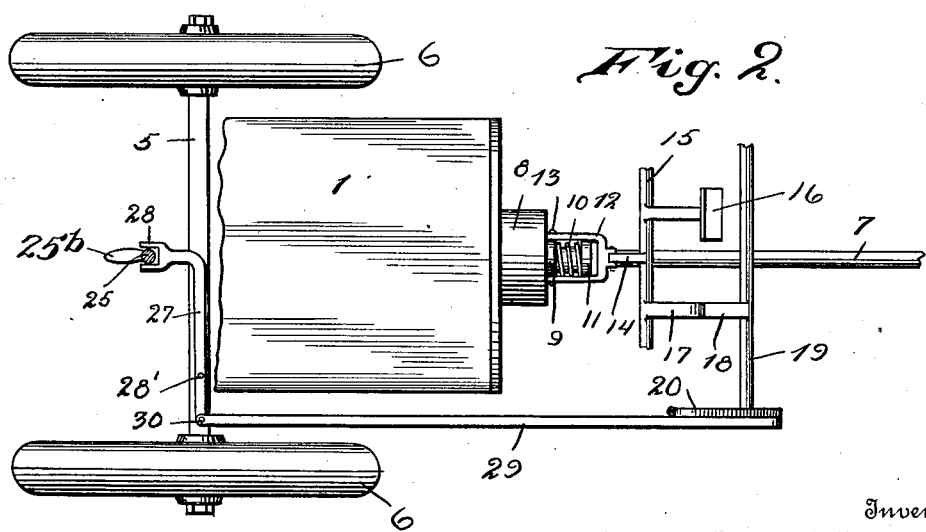

In the accompanying drawings forming a part of this specification and in which like numerals are employed to designate like parts throughout the same, Figure 1 is a side view of the front of an automobile, parts being broken away, and showing my crank holding means applied thereto, and, Fig. 2 is a plan view of the same.

In the drawings wherein is illustrated a preferred embodiment of my invention, the numeral 1 designates the hood of an automobile, within which is mounted an engine 2, having a crank-shaft 3. The hood and engine are suitably mounted upon a frame 4, which is supported in the usual manner by a front axle 5, carrying wheels 6.

The numeral 7 designates a driving shaft which operates the rear wheels (not shown) and this driving shaft is rotated from the crank shaft 3 through the medium of a clutch mechanism 8. Any suitable form of clutch mechanism may be employed but I have shown a multiple-disk clutch, which is a well known type. No detailed description of the clutch will be herein given as the same will not be claimed *per se*. Within the casing of the clutch mechanism 8 are disposed the disks which are pressed into frictional engagement with each other by a collar 9 rotatable and longitudinally movably mounted upon, the driving shaft 7. This collar is acted upon by a compressible coil spring 10 engaging a collar 11 which is rigidly mounted upon the driving shaft 7. When the collar 9 moves forwardly sufficiently the clutch mechanism is operative for transmitting rotation from the crankshaft 3 to the driving shaft 7. The collar 9 is moved longitudinally of the shaft 7 by a yoke 12 straddling the collar 9 and pivotally connected therewith by bolts 13 or the like. This yoke has pivotal connection with a lever 14, rigidly mounted upon a horizontal rock-shaft 15, upon which are rigidly mounted a foot-pedal 16 and a cam 17. Disposed below the cam 17 and engaging the same is a second cam 18, rigidly mounted upon a rock-shaft 19, upon which is rigidly mounted a controlling lever 20. This controlling lever is mounted intermediate its ends upon the rock-shaft 19. The controlling lever 20 carries a latch mechanism 21 which may engage with a stationary segment (not shown) for holding the controlling lever in different adjusted positions.

The crank shaft 3 is provided at its forward end with a clutch member 23, adapted to be engaged and disengaged by a coöperating clutch member 24. I provide a starting crank, comprising a stub shaft $25^a$, a crank-arm 25 and a handle $25^b$. The stub shaft $25^a$ of the crank is loosely journaled through a fixed bearing 26 and has the clutch member 24 rigidly connected with its inner end. It is thus seen that the crank is capable of partaking of rotary and axial movements. By the axial or longitudinal movement of the crank, the clutch members 23 and 24 may be engaged and disengaged.

The numeral 27 designates a holding lever preferably having one end forked, as shown at 28, to move into the path of travel of the crank arm for engaging and locking the crank arm 25 against rotary and axial movements. This holding lever may be pivotally secured to any fixed part of the chassis but is preferably pivotally mounted near its outer end upon the front axle 5, as shown at 28'. At its outer end the holding lever 27 has pivotal connection with a rigid rod 29, as shown at 30, which rod extends rearwardly and may be pivotally connected with any part or device which actuates, is controlled by or moves simultaneously with, the clutch 8. I preferably connect the rod 29 with the lower end of the controlling lever 20, as shown.

In the operation of my improved apparatus, when the controlling lever 20 is in the position shown in Fig. 1, the spring 10 moves the collar 9 toward the engine and renders the clutch mechanism 8 operative with respect to transmitting the rotation of the crank-shaft 3 to the driving shaft 7. If the operator could now crank the engine, the automobile would be put in motion and might do serious damage. When the lever 20 occupies the position shown in Fig. 1, the holding lever 27 has its forked end 28 in engagement with the crank arm 25, to hold the same against rotation in either direction and to prevent the crank including the crank-arm from being moved longitudinally or axially for bringing clutch members 23 and 24 into engagement.

From the description of the above referred to parts, it is obvious that it is impossible to operate the crank for starting the engine when the clutch mechanism 8 is operative with respect to transmitting rotation from the crank-shaft 3 to the driving shaft 7. The clutch mechanism 8 may be operated to disconnect crank-shaft 3 and driving shaft 7 by either oscillating the foot-pedal 16 forwardly or swinging the controlling lever 20 rearwardly. Assuming that the lever 20 has been oscillated rearwardly and clutch mechanism 8 operated for disconnecting crank-shaft 3 and the driving shaft 7, this rearward movement of the lever 20 will be imparted to the holding lever 27 through the medium of the rod 29. The lever 27 will then be swung so that its forked end 28 will be moved away from the crank arm 25. This crank arm may then be moved axially to engage the clutch members 23 and 24, and the crank arm 25 may be turned for starting the engine.

I wish it understood that the form of my invention herewith shown and described is to be taken as a preferred example of the same and that numerous changes in the shape, size and arrangement of parts may be resorted to without departing from the spirit of the invention or the scope of the subjoined claims.

Having thus described my invention, I claim:—

1. The combination with the crank-shaft of an explosive engine, of a power shaft to be driven by the crank-shaft, transmission clutch mechanism for transmitting motion from the crank-shaft to said power shaft, a starting crank comprising a crank-arm for turning the crank-shaft, a movable locking member having an end forked for receiving and holding said crank arm against rotation and a connecting rod acting simultaneously with the transmission clutch mechanism to throw the forked end of the locking means about the crank arm when the crank-shaft is connected with the power shaft.

2. The combination with a crank-shaft of an engine, of means to be driven by the crank-shaft, clutch mechanism for transmitting motion from the crank-shaft to said means, means including a controlling lever for operating the clutch mechanism, a crank including a crank arm for turning the crank-shaft, clutch mechanism serving to detachably connect said crank and crank-shaft, holding means movable into and out of the path of travel of the crank arm, and means connecting said holding means and controlling lever.

3. The combination with the crank-shaft of an explosive engine, of means to be driven by the crank-shaft, clutch mechanism for transmitting motion from the crank-shaft to said means, means for controlling the operation of the clutch mechanism, a crank comprising a crank-arm for turning the crank-shaft, holding means movable into and out of the path of travel of said crank-arm, and connecting means between the controlling means and the holding means.

4. The combination with the crank-shaft of an explosion engine, of means to be driven by the crank-shaft, clutch mechanism for transmitting motion from the crank-shaft to said means, means including a controlling lever for operating the clutch mechanism, a crank including a crank-arm for turning the crank-shaft, a pivoted lever provided with means to hold the crank-arm against movement and movable toward and away from the crank-arm, and means connecting said pivoted lever and controlling lever.

5. The combination with the crank-shaft of an explosive engine, of means to be driven by the crank-shaft, clutch mechanism for transmitting motion from the crank-shaft to said means, means including a controlling lever for operating the clutch mechanism, a crank including a crank-arm for turning the crank-shaft, a pivoted lever having one end forked for receiving and holding said crank-arm against rotation, and a rod connecting the pivoted lever and controlling lever.

6. The combination with the crank-shaft of an explosive engine, of means to be operated by the crank-shaft, clutch mechanism for transmitting rotation from the crank-shaft to said means, an element for controlling the operation of the clutch mechanism, a starting shaft for turning the crank-shaft and provided with a manually moved crank arm, an element movable into the path of travel of the crank arm to rigidly hold the same against movement, and connecting means between the first and second named elements.

7. The combination with an engine crank shaft, of mechanism to be operated thereby, clutch mechanism for transmitting rotation from the engine crank shaft to the first named mechanism, a starting crank for turning the engine crank shaft, including a crank arm, and means moving simultaneously with the movement of elements of the clutch mechanism for engaging the crank arm, to prevent the operator from starting the engine when said clutch mechanism is operative for transferring rotation of the engine crank shaft to the first named mechanism.

8. The combination with the crank-shaft of an explosive engine, of a crank including a crank-arm for turning said crank-shaft, a pivoted lever having one end forked and adapted for movement into and out of the path of travel of the crank-arm, and means to move the pivoted lever.

9. The combination with the crank-shaft of an explosive engine, of a crank including a crank-arm for turning said crank-shaft, an element disposed near the crank-arm and movable into and out of the path of travel of the same, an operating lever, and connecting means between the operating lever and element.

10. The combination with the crank-shaft of an explosive engine, of a crank including a crank-arm for turning the crank-shaft, clutch mechanism to be driven by the crank-shaft, and means connected and operated simultaneously with the clutch mechanism to engage the crank-arm for holding the same against rotation.

In testimony whereof I affix my signature in presence of two witnesses.

FRANKLIN W. PUTNAM.

Witnesses:
WM. SHANLY,
H. E. BIXBY.

Copies of this patent may be obtained for five cents each, by addressing the "Commissioner of Patents, Washington, D. C."